United States Patent
Tsao

(10) Patent No.: US 9,015,321 B2
(45) Date of Patent: *Apr. 21, 2015

(54) CONCURRENT WEB BASED MULTITASKING SUPPORT FOR COMPUTING SYSTEM

(75) Inventor: Sheng Tai (Ted) Tsao, San Jose, CA (US)

(73) Assignee: Sheng Tai Tsao, Fremont, CA (US)

( * ) Notice: Subject to any disclaimer, the term of this patent is extended or adjusted under 35 U.S.C. 154(b) by 1718 days.

This patent is subject to a terminal disclaimer.

(21) Appl. No.: 12/079,521

(22) Filed: Mar. 27, 2008

(65) Prior Publication Data

US 2008/0184228 A1     Jul. 31, 2008

Related U.S. Application Data

(63) Continuation of application No. 10/713,904, filed on Aug. 6, 2002, now Pat. No. 7,418,702.

(51) Int. Cl.
  *G06F 15/173*     (2006.01)
  *H04L 29/08*      (2006.01)
  *G06F 9/52*       (2006.01)
  *G06F 9/54*       (2006.01)
  *H04L 12/24*      (2006.01)

(52) U.S. Cl.
  CPC .............. *H04L 67/06* (2013.01); *G06F 9/526* (2013.01); *G06F 9/54* (2013.01); *H04L 67/02* (2013.01); *H04L 67/10* (2013.01); *H04L 41/0806* (2013.01); *G06F 2209/541* (2013.01)

(58) Field of Classification Search
  CPC .......... H04L 63/10; G06F 9/526; G06F 9/54; G06F 2209/541
  USPC ........................................................ 711/147
  See application file for complete search history.

(56) References Cited

U.S. PATENT DOCUMENTS

| | | | | |
|---|---|---|---|---|
| 4,825,354 A * | 4/1989 | Agrawal et al. | ...... | 1/1 |
| 5,894,555 A * | 4/1999 | Harada et al. | ...... | 709/213 |
| 6,003,032 A * | 12/1999 | Bunney et al. | ...... | 709/203 |
| 6,035,404 A * | 3/2000 | Zhao | ...... | 726/6 |
| 6,070,184 A * | 5/2000 | Blount et al. | ...... | 709/200 |
| 6,141,759 A * | 10/2000 | Braddy | ...... | 726/14 |
| 6,211,874 B1 * | 4/2001 | Himmel et al. | ...... | 715/781 |
| 6,438,562 B1 * | 8/2002 | Gupta et al. | ...... | 707/696 |
| 6,529,948 B1 * | 3/2003 | Bowman-Amuah | ...... | 709/217 |
| 6,769,019 B2 * | 7/2004 | Ferguson | ...... | 709/219 |
| 7,082,604 B2 * | 7/2006 | Schneiderman | ...... | 718/100 |
| 7,127,713 B2 * | 10/2006 | Davis et al. | ...... | 717/177 |
| 7,418,702 B2 * | 8/2008 | Tsao | ...... | 718/1 |
| 7,454,457 B1 * | 11/2008 | Lowery et al. | ...... | 709/203 |
| 7,533,132 B2 * | 5/2009 | Schaefer et al. | ...... | 1/1 |
| 7,885,994 B2 * | 2/2011 | Lavanya et al. | ...... | 709/201 |
| 8,103,713 B2 * | 1/2012 | Khodabakchian et al. | ... | 709/201 |
| 8,572,236 B2 * | 10/2013 | Sherb et al. | ...... | 709/224 |
| 2002/0083265 A1 * | 6/2002 | Brough et al. | ...... | 711/118 |
| 2002/0087886 A1 * | 7/2002 | Ellis | ...... | 713/201 |
| 2002/0116397 A1 * | 8/2002 | Berg | ...... | 707/200 |
| 2003/0028611 A1 * | 2/2003 | Kenny et al. | ...... | 709/217 |
| 2003/0187995 A1 * | 10/2003 | Fok et al. | ...... | 709/227 |

(Continued)

*Primary Examiner* — Farid Homayounmehr
*Assistant Examiner* — Lizbeth Torres-Diaz

(57) ABSTRACT

Supporting of multiple concurrent tasks to be submitted via a single web-browser is important because it improves efficiency for user to utilize the web browser for daily works. The supporting of web based multitasking is also an important step towards creating a web based computer user work environment.

22 Claims, 7 Drawing Sheets

(56) References Cited

U.S. PATENT DOCUMENTS

| | | |
|---|---|---|
| 2004/0030643 A1* | 2/2004 | Madison et al. ............... 705/39 |
| 2004/0030739 A1* | 2/2004 | Yousefi'zadeh ............. 709/201 |
| 2005/0050204 A1* | 3/2005 | Beck et al. ................... 709/227 |
| 2007/0038994 A1* | 2/2007 | Davis et al. .................. 717/174 |

* cited by examiner

Data traveling between web-console and console supporting software a) Data Path 1:

Referred as sending data from web-console (9 of Fig. 2) to console support software (6 of Fig. 2) or referred as console supporting software (6 of Fig. 2) receiving data from web-console (9 of Fig. 2).

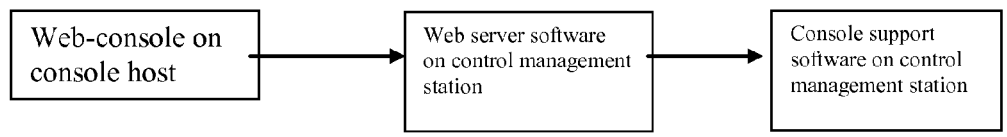

b) Data Path 2: (reverse path)

Referred as sending data from console supporting software (6 of Fig. 2) to web-console (9 of Fig. 2) or referred as web-console (9 of Fig. 2) receiving data from console supporting software (6 of Fig. 2)

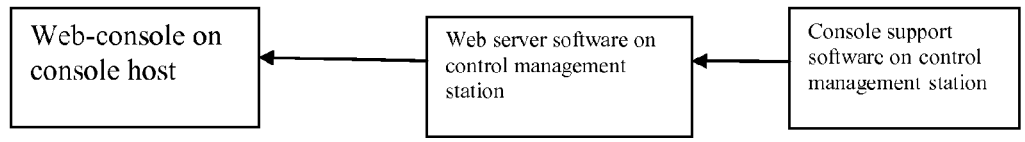

Fig. 3

The abstraction of data structure for multiple simultaneous concurrent tasks and operations support in CCDSVM environment.

Task List

The typical hardware components of a computer system 200 such as for control management station, system units, and console host:

CONCURRENT WEB BASED MULTITASKING SUPPORT FOR COMPUTING SYSTEM

CROSS-REFERENCES RELATED TO APPLICATION(S)

This is a continuation application of (a) U.S. patent application Ser. No. 10/713,904 filed on Aug. 6, 2002 and converted from U.S. Provisional Application 60/401,238 and now is a U.S. Pat. No. 7,418,702. All above applications are herein incorporated by reference in their entireties for all purpose.

FIELD OF THE INVENTION

The present invention generally relates to support a web based multitasking mechanism for a computing device or to a plurality of computing devices in a web based central controlled distributed scalable virtual machine ("CCDSVM") in respect to a web based computer user work environment.

BACKGROUND OF THE INVENTION

A typical computer system provides a computer user work environment to each of end users, wherein the computer user work environment runs on top of a generic computer operating system. With this work environment, the end user can login to the computer system and setup access controls over various computing resources based on the end user's permissions and roles. Therefore, the end user, for example, could be permitted to configure computer resources such as disks, networks, file folder/directory systems, files, and others. Also, the end user is allowed to perform various computer tasks & operations including access to computer applications. In response to the end user's access, the computer operating system of a computer system executes each user submitted task and provides the results of tasks to the end user. Specially, with a generic computer operating system, this computer user work environment provides each of a plurality of concurrent users with capability of to perform multiple concurrent tasks or operations simultaneously.

The computer user work environment has evolved from a paper tape & punch card based environment to a command line environment, and further to a window based user interactive environment in the past decades. This invention provides users a web-based computer user work (operating) environment on top of generic operating system for a single computer or for multiple computers for allowing a user access to one or multiple computing devices through a conventional web-browser.

BRIEF DESCRIPTION OF THE DRAWINGS

The accompanying drawings, which are incorporated into and constitute a part of this specification, illustrate one or more examples of embodiments and together with the description of the embodiments, serve to explain the principles and implementations of the embodiments.

In the drawings:

FIG. 3 illustrates an example of basic data flow between a web-console on a console device and a console supporting software of a control management system.

BRIEF DESCRIPTION OF THIS INVENTION

The traditional web server or other web accessible server may support a user from a web browser in a computing device across a network to perform tasks for access to the server. Usually, such task will get quick response and could be finished in a short period of time. Fore example, a task of checking a server's status or getting the server's other information is such type of the task. However, the traditional server does not support user to perform multiple simultaneous concurrent tasks submitted via the same web-browser, especially such problem become more clear to the user when a task requires more time to be finished.

Figure 1:
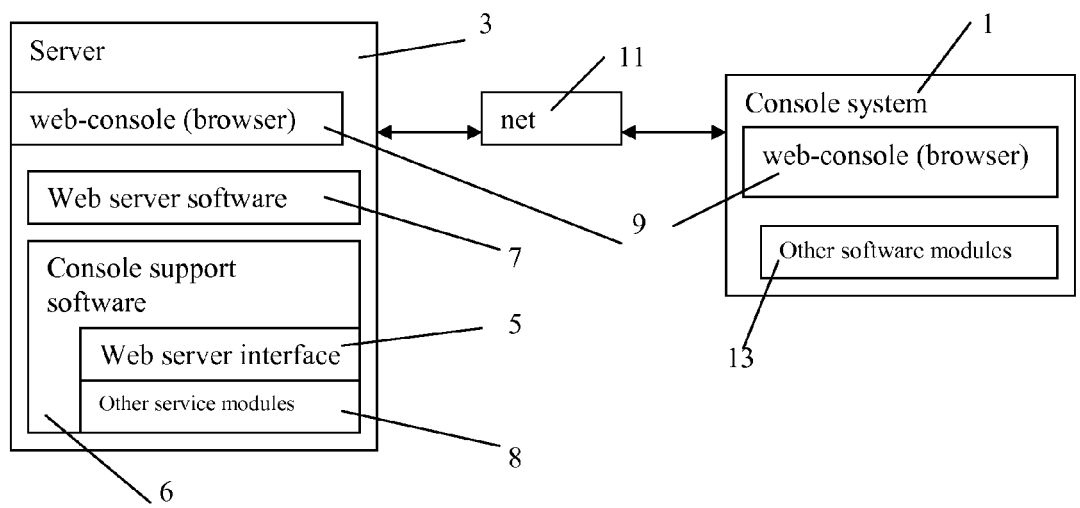
FIG. 1 illustrates an example of a simplified multi-tasks support for web-console (web browser) in a simple computing environment.

For example, a task of creating a 60 GB file system on the server, or configuring a raid controller on that server illustrated in FIG. 1 is such a time consuming task. Because these tasks often take a large amount of time to be finished, they will hang in the web-console (web browser) on a console host, as a result, a user only can wait for the task to be finished and no other tasks could be performed from the same web-console at the same period of time. In addition, traditional console supporting software does not work for a more complicated environment such as the CCDSVM environment illustrated in FIG. 2.

Figure 2:
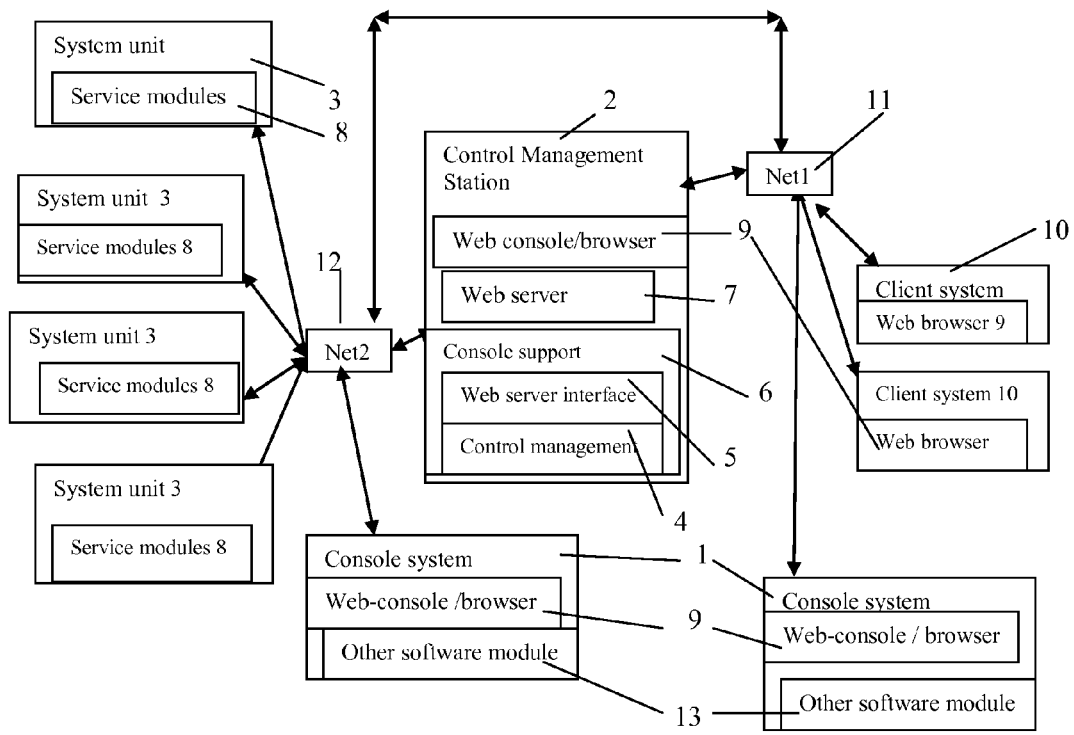
FIG. 2 illustrates an example of a simplified multi-tasks support for web-consoles (web browser) in a CCDSVM environment.

To solve such problem and effectively to support multiple simultaneous concurrent tasks through a web-console as illustrated in the FIG. 1 and FIG. 2, a new method will be described hereinafter. In one embodiment, for such support in the CCDSVM environment, the console supporting software illustrated in FIG. 1 needs to include additional control management software modules illustrated in FIG. 2 and others. As illustrated in FIG. 2, the control management software module shall communicate and control all system units 3 and each of the system units 3 needs service software modules 8 to communicate with the control management software modules 4 of the console support software 6 of the control system 2.

Figure 5:
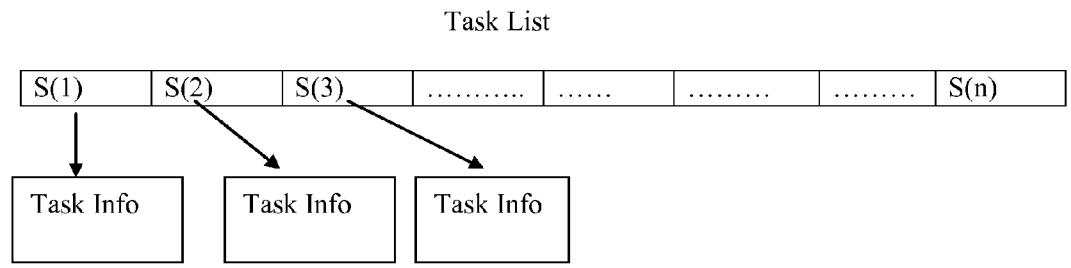
FIG. 5 illustrates an embodiment of a user space task list, which represents an abstraction of data structure for controlling multiple simultaneous concurrent tasks and operations in the CCDSVM environment.

In addition, a user space task list illustrated in FIG. 5 could be used together with conventional or non-conventional locks to support all multiple simultaneous concurrent tasks and operations. With this invention, the multi-tasks support for the web-console in a simple computing environment shown in FIG. 1 has been viewed as a special case of such support in the CCDSVM environment shown in FIG. 2. The CCDSVM is degenerated into a simple server) environment as illustrated in the (FIG. 1) if there is no multiple system units 3 presented.

These and other features, aspects and advantages of the present invention will become understood with reference to the following description, appended claims and accompanying figures set forth below.

DETAILED DESCRIPTION OF THE INVENTION

The CCDSVM, in one embodiment, is configured to provide a control management station ("control system") to control a group of computing systems and provide distributed services to a plurality of client systems across Intranet, Internet as well as a LAN or WAN environment. The software components of the CCDSVM form a virtual operating environment.

For the purpose of readiness, several terminologies are clarified therein before moving forward. When a server provides a user access to and operating the server through a web-browser on a computing system (device) such as a desktop, laptop, server, PDA, or cell phone, this web-browser is often referred as a web-console. With the CCDSVM, a permitted user from the web-console is able to access to and operate the entire CCDSVM.

To simplify the discussion, the terms of thread and process in present invention are roughly used without differentiation regardless of the very restricted definition of the thread and process in computer science field. Here both thread and process are basically referred as a sequence of computer program instructions based on a piece of program code embedded in a storage medium that starts to be executed by a computer system step by step to carry out a computer task.

Lock is a mechanism that allows a thread to look a computer resource for its own use and prevents other threads from access to the same computer resource at the same time. There is conventional lock which can be acquired and released by the same thread. The conventional lock mechanisms have been used by most software developer crossing the software industry. The lock described in this invention may or may not be a conventional one. The non-conventional lock mechanisms created in this invention can be acquired by one thread and may be released by same thread or by another thread. Therefore, the non-conventional lock serves threads on the computing systems of present application.

FIG. 1 illustrates an example of a web-console scheme in a simple computing environment that includes a console host 1, a server 3, and a communication network 11. The console host 1 and the server 3, each further includes a web-console 9 (a browser) It should be noted that the same reference indicators will be used throughout the drawings and the following description to refer to the same or like items.

The console host 1, from which a user is able to perform system tasks or operations for the server 3 through the web-console (browser) 9. The console host 1 can be any computing system connected to the network 11 such as a server, a desktop PC, a laptop PC, a hand held PDA, or a cell phone. The web browser 9 may be a commercially available software from any vendor or a proprietary software. The web browser 9 is able to handle web protocol such as HTTP. The console host 1 may also include other software modules 13 that may be implemented with any suitable programming languages such as C, C++, Java, XML, et cetera. The other software modules 13 are used to communicate between the server 3 and the console host 1 using IP, non-IP or any suitable protocols for receiving and/or sending data between the console host 1 and the server 3.

The server 3 could be a web server or any kind of computing system configured with web server software that includes web server software 7 and console supporting software 6. The console supporting software 6 includes web server interface 5 and other services software modules 8, where the other services software 8 is operated natively on the server 3. The web server software 7 may be a commercially available software or proprietary software, which is able to accept and handle the web protocol such as HTTP. A native web-console (browser) 9 also enables a user to access and operate the server computer 3 locally.

Net 11 represents a network infrastructure such as Internet, intranet, WAN or (LAN). The net 11 includes all kind of related network equipment and media such as switches/routers, and different kind of connecting cables and wireless communication media.

FIG. 2 shows an example of a simplified block diagram for an embodiment of the CCDSVM. The CCDSVM system includes console hosts 1, a control management station ("control system") 2, system units 3, networks of net 11 and net 12, and client systems 10. The console hosts 1 could be any computing system connected to the network such as a server, a desktop PC, a laptop PC, a hand held PDA, or a cell phone. A web browser 9 on the console host 1 can be used to access and operate the entire CCDSVM. The web browser 9 may be an commercially available software from any vendor or a proprietary software. The web browser 9 is able to handle web protocol such as HTTP. A difference between a web-console 9 and a web browser is that the web-console 9 allows a user accessing system information and performing system operation over computing systems such as in the CCDSVM environment.

The console host 1 may also include other software modules 13, which may be implemented with any suitable programming languages such as C, C++, Java, XML etc. The software modules 13 may be used to facilitate communications between the control system 2 and the console hosts 1 using IP, non-IP or any suitable protocols for receiving or sending data between the console host 1 and the control system 2. To support a non-web-based networked console, the software configured for replacing the web console 9 shall be capable of handling protocols other than web protocols such as HTTP for communicating with the console supporting software 6 on the control system.

The control system 2 could be any computing system on the network such as a server, a desktop PC, a laptop PC, or others such as a communication system or device. The control system 2 includes web server software 7 and console supporting software 6. The console supporting software 6 includes web server interface software modules 5 and control management software modules 4. It should be noted that the console supporting software 6 may includes others service software modules 8. It may also have a native web browser 9 used as a native web-console 9. The web server software 7 discussed earlier could be commercially available software from a major vendor or a proprietary software that is able to accept and handle the web protocol such as HTTP. The web server software 7 sends data to and receives data from the web-console 9 of the console hosts 1. In one embodiment, the console support software 6 may also support non-web based console as mentioned before.

The console supporting software 6 can be implemented with any suitable languages such as C, C++, Java, XML, etc. or even implemented by using a combination of different languages as long as it provides the features and functionality described in this invention. That means it is language independent. In addition, the communication protocol used between the console support software 6 and the service software modules 8 of the system units 3 could be any suitable protocol such IP based, or non-IP based or other protocols.

The console support software 6 is configured to communicate and manage one or more system units 3 and collects resource information from the control system 2 and/or from one or more system units 3.

There may be several fixed threads being created based on the control management software modules 4, and there are may be various number of threads that are created based on the web server interface software modules 5 for serving each task submitted by a user through a web-console 9. Further, all of these threads may be communicated with each other through inter-process communication and are simply referred as the thread of the console supporting software 6. However, to simplify the discussion, they may be just referred as the console supporting software 6 without mentioning the thread at all.

If there is a need to support a non-web based networked console, there is no need for the web server software 7 and web server interfacing software module 5 to be employed. Instead, an additional network software module is required that could be implemented with any suitable programming language and any suitable communication protocol other than web protocol (HTTP). This network software module can communicate with networked console software 13 on the console host 1 across a network and can communicate with the rest of the console supporting software 6 via inter-process communication mechanism.

The system unit 3 could be any computing system connected to the control system 2 across the network such as a server, a desktop PC, a laptop PC, a hand held PDA, a cell phone, and other operational computing system. The server could be a video server, a web server, a storage block data server (SAN unit), a network attached storage unit (NAS), a video monitoring device, a database server, a security monitoring device, and so forth without limits. The system unit 3 contains service software modules 8 that are capable of communicating with the outside world. For example, the service modules 8 is capable to communicate with the control management software 4 of the control system 2 for carrying out the tasks distributed from the control system 2, or to communicate with the clients 10 of the CCDSVM for delivering services to them, or to communicate with another system unit 3 for transferring the data. The service software modules 8 could be implemented with any suitable programming languages such as C, C++, Java, or others. It should be noted that the communication protocol could be any suitable protocol such as IP (Internet Protocol) base or other non-IP based protocol.

The net 11 represents any kind of communication links between the control system 2 and the web-console 9 or the client hosts 10. The net 11 could be an infrastructure of internet, intranet, LAN, WAN or other type of communication networks that comprises connection media such as cables of Ethernet, optical Fiber, and/or other, wireless media, buses, and includes communication equipment such as switches, routers, and/or adapters.

The net2 12 also represents a communication infrastructure comprising communication media and equipment that are similar to the net1 11 has, except for providing communication between the control system 2 and the system units 3 or the web-consoles 9 across the infrastructure of internet, intranet, LAN, WAN, or other.

The client systems 10 are not part of the CCDSVM but they may requests services from the CCDSVM, as shown in FIG. 2, via a web browser 9.

FIG. 3 illustrates a simplified data flow between the web-console 9 of the console host 1 of FIG. 2 and the console supporting software 6 of the control system 2 of FIG. 2. Data travel from the web-console 9 to the console supporting software 6 includes two steps. First, the data goes from the web-console 9 to the web server software 7 of FIG. 2 via the net 11 or 12 of FIG. 2. Second, the console supporting software 6 obtains the data from the web server software 7 of FIG. 2 via inter-process communication. To simplify the discussion, this data traveling path will simply refer to as the console supporting software 6 receives/obtains the data from the web-console 9 or refer to as the data being sent from the web-console 9 to the console supporting software 6.

Data traveling from the console supporting software 6 to the web-console 9 includes two reverse steps. First, the web server software 7 obtains the data from the console supporting software 6 via inter-process communication. Second, the web server software 7 sends data to the web-console 9 via the net 11 or 12. To simplify the rest of discussion, this reverse data traveling will refer to as data being sent from the console supporting software 6 to the web-console 9 or refer to as the web-console 9 receives/obtains data from the console supporting software 6. In addition, the terms of data, information, and information in a web page will be used interchangeably in present invention.

Figure 4:
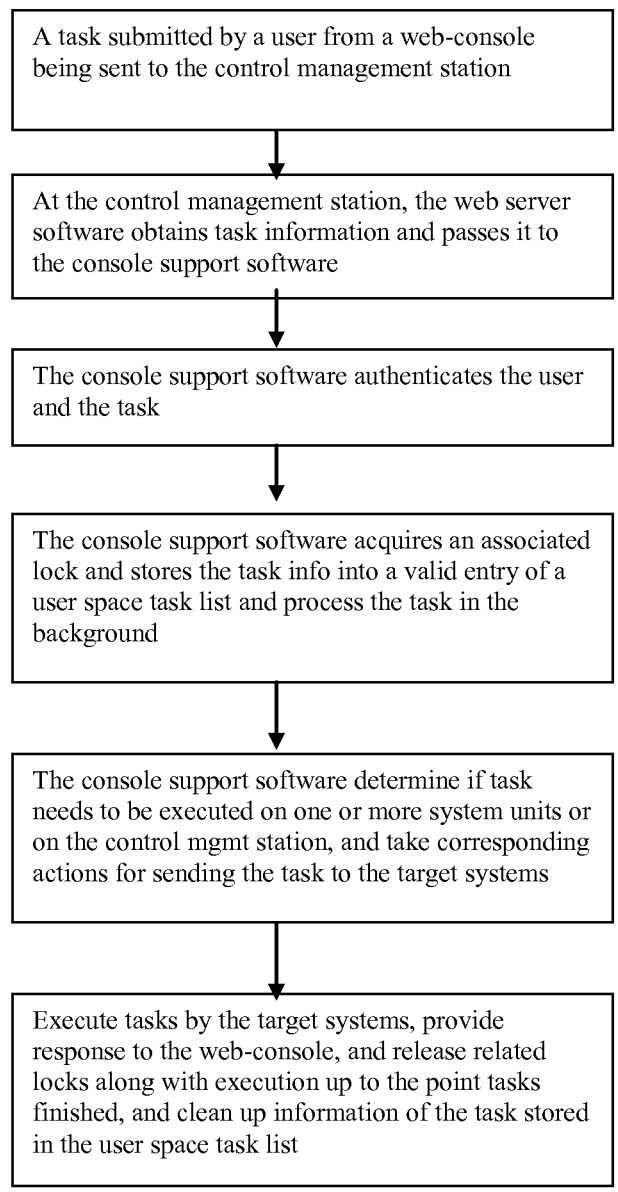
FIG. 4 illustrates an example of task processing flow in the CCDSVM environment.

FIG. 4 shows the basic tasks and operation processing flow chart, which initiated from the web-console 9.

FIG. 5 shows one embodiment of a user space task list. Each entry on the user space task list can be used to store information of a task received from the web-console 9. The stored task information in the entry will be cleared upon the task execution is finished.

Figure 6:
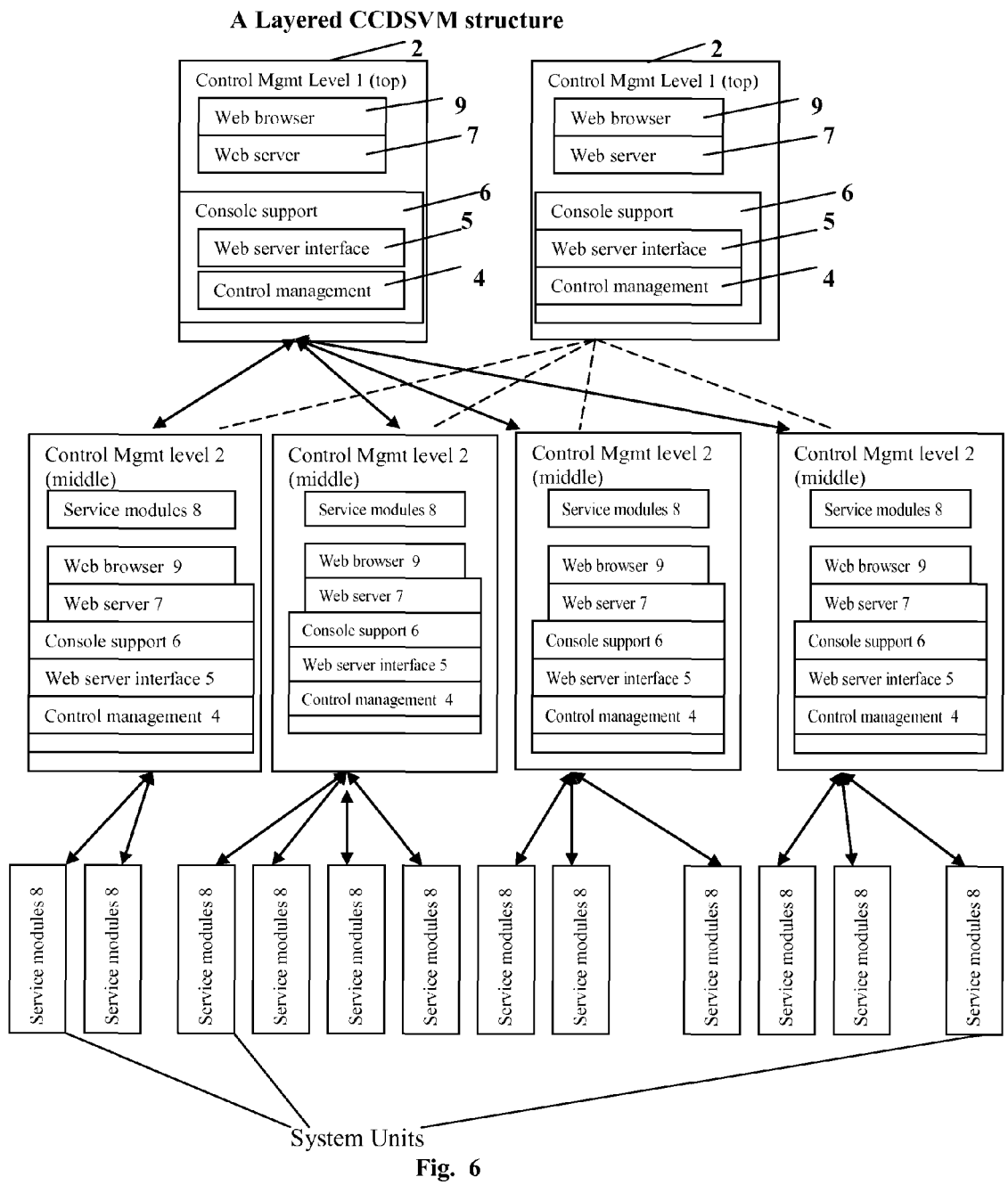
FIG. 6 illustrates an embodiment of a multiple layered CCDSVM structure.

FIG. 6 illustrates another embodiment of a multiple layered CCDSVM computing environment, which provides a flexible scalability mechanism to efficiently support thousands of heterogeneous system units 3. With this structure, a control system 2 at middle layer 2 becomes a system unit 3 to a layer 1 (top level) control system 2 and is controlled by the control system 2 at up layer 1, and still behaves as a control system 2 to layer 3 system unit 3.

Figure 7:
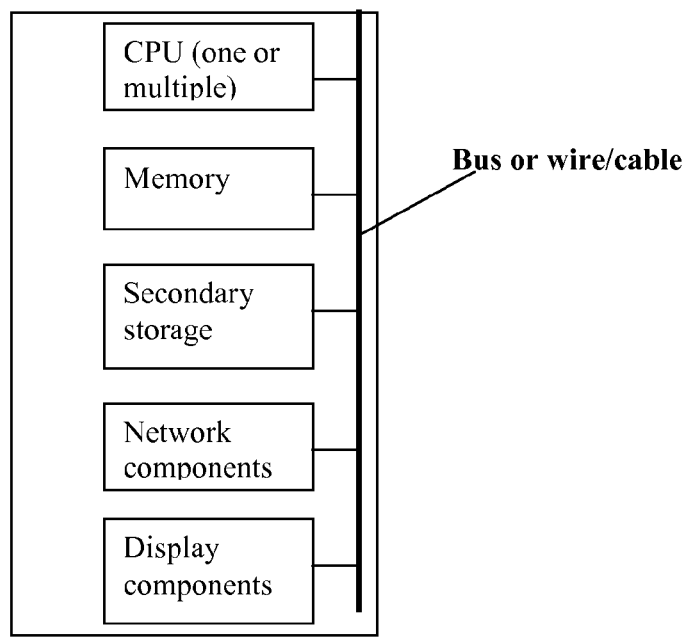
FIG. 7 illustrates typical hardware components for a computing device such as for a control management system, system units, and console system of present invention, where the computing device being configured with one or more processors such as CPU, memories, secondary storages such as disks or memory sticks, network interface cards, and display components such as monitor or others. These components are typically connected through connection media such as buses.

FIG. 7 illustrates a embodiment of typical hardware components for a computing system such as for the control management system 2, system units 3, and console hosts 1. The typical hardware consists of one or more CPU, memory, secondary storage such as disk drives and/or memory sticks, the network interface cards, and display components such as monitor or others. These components are typically connected internally through buses.

The detailed explanation of FIG. 2 will demonstrate how can multiple concurrent tasks be initiated from a web-console 9 and can be executed either on one of the system units 3 and/or on the control system 2 according to this invention.

In one example, a user A at a web-console 9 of a console host 1 receives an authentication from the console supporting software 6 of a control system 2. In one embodiment, a successfully login on the control system 2 is considered an authentication because it authorizes the user A access to the CCDSVM. Thereafter, the user A can obtain all necessary information about the system units 3 and the control system 2 including operation menu from the console supporting software 6. When the user A submits a task for a selected target computing system, which is either a system unit 3 or the control system 2, the task information is sent across the net 11 or 12, by the web-console 9 of the console host 1, to the control system 2 through communication to the console support software 6.

A thread is created based on the console support software 6, where the thread will serve and process this task in the background. The created thread acquires a lock and stores the task information into a valid entry on a user level task list before processing the task in the background as shown in FIG. 5. This ensures that the multiple tasks can be initiated concurrently by the user from the same web-console 9 of FIG. 2 without blocking the delaying of said information, and without effecting or blocking each other in the web-console 9 for free from racing.

In addition, multiple web-consoles 9 for multiple concurrent users anywhere on the net 11 or 12 also can be supported. The obtained locks for this task will be properly released one at a time along with the task execution up to a point when the task is finally finished. Therefore, each task could be executed without time delay. Also, the stored task information will be removed upon the execution of the task is finished.

If total tasks submitted from the web-consoles 9 have succeeded the maximum tasks allowed by the console supporting software 6, the task will be failed and the task is finished. The locks will be released by the corresponding thread and the user A on the web-console 9 will be notified correspondingly.

If an existing task is in a stage of changing a resource object on a target system and if a newly created task will make change the same resource object residing in that target system, the new task will fail or may have to wait until the previous task is finished. Further, if a task is failed, the locks associated with the task will be release by the thread and the user A on the web-console 9 will be notified across the network of 11 or 12 by the console support software 6.

The credential of executing a specific task on a specific target computing system submitted by the user A is also checked. In addition, an ordinary users' access & operation permissions and credentials are setup by an administrator with supervisor or special privileges. If the user A is not permitted to perform any task on such target computing system or is not permitted to perform a specific task on any one of the computing systems, the task execution will fail and the user A will be notified. Otherwise, the task will be carried out by the corresponding thread on the target computing system that is either a control system 2 or a system unit 3. If there is a need, the console supporting software 6 will send the results or data back to the web-console 9 and the task is finished. When the task is failed or succeeded, the threads of the console supporting software 6 will release the locks acquired for this task.

Further, if the task needs to be executed on the control system 2, the thread created based on the console supporting software 6 will carry out this task. The threads of the console support software 6 also need to determine if they need to create another thread to execute this task. If there is a need, another thread will be created to execute this task. Once the task is finished, the corresponding locks will be released by the console supporting software 6.

Further, if a task needs to be executed on a system unit 3, the console supporting software 6 will send the task information via the net 12 to the service software module 8 of the target system unit 3. The thread based on the service software module 8 of the target system unit 3 will carry out this task. The service software module 8 on the target system unit 3 needs to determine if an additional thread needs to be created in order to execute such task. If there is a need, an additional thread is created to execute this task. Once the task is finished on the target system unit 3, the corresponding status or result of the task execution is transmitted back to the console supporting software 6 of the control system 2. Upon receiving the task finished status, the locks associated with the thread of the console support software 6 for that task are released.

The Task Issued From Web-Console

The multiple concurrent tasks issued from a web-console 9 by a user could be any of the followings:

a) Move or transmit data such as a multiple gigabytes of file or other data in any form from a location (point) to another location (point) on a computing system of the CCDSVM, or from a computing system to another computing system within the CCDSVM.

b) Configure, partition and assign entire storage system (raid/disk) within the CCDSVM c) Setup authentication for restricting a specific user from a specific web-console on a specific console host with privilege for access to the entire CCDSVM or access to a specific computing system, which could be any one of the system units 3 or a control system 2. Setting up steps for authentication of specific services provided by one or more specific system units 3.

d) Monitor and display activities and status for networks, storages, hardware processors such as CPUs, processes and threads for one or more of computing systems in the CCDSVM.

e) Create file system, file and directory structures, and support all other related data file operations for files in the control management system 2 or in the system units 3.

f) And all other type of tasks and operations that might be run in other operating system (OS) environment.

The capability of providing user to perform the multiple concurrent simultaneous operations and tasks via the web console 9 has indicated that this invention has created a web-based user work environment of an operating system for a computer system in the web environment. Further, this is a consistent working environment for any operating system of any computer system since it allows a user access to exact the same working environment through the web-console 9, which could be a web browser either located natively on the computing system or located on other remote systems.

User Login

The user-login mechanism is also supported by the console supporting software 6. The web-console 9 of a console host 1 obtains a login web page from the console supporting software 6 of the control system 2 via the network 11 & 12. Once the user provides an account name and a password via the login page displayed in the web-console 9, the authentication information is sent to the console supporting software 6 for validation. Upon successful validating the user account and password information, the console support software 6 sends all necessary information such as IP addresses to the web-console 9, wherein the information also includes the information of the control system 2 and system units 3.

The Maximum Tasks

The maximum multiple concurrent simultaneous tasks that can be submitted from the web-consoles 9 are determined by the console support software modules 6, and they are also determined based on the needs and the capacity of the control system 2.

The Credential Checking

The credential of a user includes the permission for access to all or partial computing systems or a single computing system within the CCDSVM. The credential further includes the permission to run all tasks or partial tasks, which are listed in the previous section of "The Task Issued From Web-Console". It also includes the permission of access to a specific size of storage volumes allocated to the user. In another example, a user B may be granted a permission to run tasks on computing systems X, Y, and Z. Another user C may be granted a permission to run tasks on the entire computing systems in the CCDSVM environment. The user C might be allowed to get system status from the computing systems X, Y, and Z only while the user B may be allowed to run all tasks on the computing systems X, Y, and Z. Each computing system mentioned here could be a control system 2 or any of system units 3. This basically represents a two-level authentication policy and checking. The first level is the security imposed on the control system 2 and the second level is the security imposed on the system units 3.

The Web-Server Interface Software Modules

The web-server interfacing software module 5 is responsible to receive information from or send information to the web server software 7. It also interacts with the control management modules 4 via inter-process communication and communicates with service module 8 of the system unit 3 via the net 12.

The Control Management Software Modules

The control management modules 4 on the control system 2 are responsible for communicating with the system units 3 for sending data to or receiving data from the system units 3 via the net 12. It also provides information of the system units 3 to the web interface software modules 5 of the control system 2 via an inter-process communication mechanism.

The Layered CCDSVM Structure

To be more efficiently support multiple concurrent tasks over a larger number of the system units 3, the CCDSVM can be organized into a multi-layered structure as illustrated in FIG. 6. With this layered structure, the CCDSVM can be sub-divided into different groups. For example, each one of level-2 control systems could function both as the control system 2 for controlling the system units 3 below it in one of the groups and function as a system unit 3 to be controlled by the level-1 control system 2. Therefore, the level-2 control management station must be configured with related software modules for both the control management station 2 and the system unit 3.

What is claimed is:

1. A method for access to web resources comprising:
   executing, by a computing device, a web browser to display information about resources, and allowing a user to select a first resource from the information displayed and submit a first request for access to the first resource; and
   processing the first request submitted by the user, including to:
      store information about the first request and invoking a lock protection mechanism to protect the storing of the information;
      process, according to the stored information, the first request in the background and cause the display of the information about the resources without being blocked in the web browser on the computing device to allow the user selecting a second resource from the information displayed and submitting a second request for access to the second resource without waiting for completion of the first request for access the first resource; and
      remove the stored information about the first request in respect to completion of the first request.

2. A program product comprising:
   a non-transitory computer-readable medium, in a computing device, comprising program code which, when executed by the computing device, causes the computing device to:
      execute a web browser to display information about resources, and allow a user selecting a first resource from the information displayed and submitting a first request for access to the first resource; and
      process the first request submitted by the user, including to:
         store information about the first request and invoking a lock protection mechanism to protect the storing of the information;
         process, according to the stored information, the first request in the background and cause the display of the information about the resources without being blocked in the web browser on the computing device to allow the user selecting a second resource from the information displayed and submitting a second request for access to the second resource without waiting for completion of the first request for access the first resource; and
         remove the stored information about the first request in respect to the completion of the first request.

3. A computing device comprising:
   at least one processor, one network interface, and
   one non-transitory computer-readable medium comprising program code which, when executed by the at least one processor, causes the computing device to:
   execute a web browser to display information about resources, and allow a user selecting a first resource from the information displayed and submitting a first request for access to the first resource; and
   process the first request submitted by the user, including to:
      store information about the first request and invoking a lock protection mechanism to protect the storing of the information;
      process, according to the stored information, the first request in the background and cause the display of the information about the resources without being blocked in the web browser on the computing device to allow the user selecting a second resource from the information displayed and submitting a second request for access to the second resource without waiting for completion of the first request for access the first resource; and
      remove the stored information about the first request in respect to the completion of the first request.

4. The method of claim 1, wherein the first resource resides in a first remote server and information of the first resource is obtained by the computing device from the first remote server across a network.

5. The method of claim 4, wherein the processing of the first request comprises to send the first request, according to physical location of the first resource, to the first remote server for further processing the first request.

6. The method of claim 5, further comprising: obtaining a response, comprising status or result of the processing of the first request, from the first remote server and causing displaying of the response on the computing device.

7. The method of claim 1, wherein each of the first and second requests further is for access to an application service of video, web, database, security monitoring, or storage service, access to a data object of file, file system, or folder structure, or access to a device of storage, network or processor.

8. The method of claim 1, further comprising to process the second request in the same way as to process the first request.

9. The program product of claim 2, wherein the first resource further resides in a first remote server; wherein the second resource further resides in a second remote server.

10. The program product of claim 9, wherein the program code causing the computing device to process the first request comprises to send the first request, according to physical location of the first resource, to the first remote server for further processing the first request.

11. The program product of claim 10, wherein the program code further causes the computing device to obtain a response, comprising status or result of the processing of the first request, from the first remote server and causes displaying of the response on the computing device.

12. The program product of claim 2, wherein the program code further causes the computing device to process the second request in the same way as to process the first request.

13. The computing device of claim 3, wherein the first resource resides in a first remote server, wherein information of the first resource is obtained by the computing device from the first remote server across a network.

14. The computing device of claim 13, wherein the program code causing the computing device to process the first request comprises to send the first request, according to physical location of the first resource, to the first remote server for further processing the first request.

15. The computing device of claim 14, wherein the computing device is configured to obtain a response, comprising status or result of the processing of the first request, from the first remote server, and cause displaying the response on the computing device.

16. The computing device of claim 3, wherein each of the first and second requests further is for access to an application service of video, web, database, security monitoring, or storage service, access to a data object of file, file system, or folder structure, or access to a device of storage, network or processor.

17. The computing device of claim 3, wherein the program code further causes the computing device to process the second request in the same way as to process the first request.

18. The computing device of claim 17, wherein the second resource further resides in a second remote server accessible to the computing device across a network.

19. The computing device of claim 18, wherein said second resource further resides in the first remote server.

20. The method of claim 8, wherein the second resource further resides in a second remote server accessible to the computing device across a network.

21. The method of claim 9, wherein the second resource further resides in the first remote server.

22. The program product of claim 10, wherein the program code causing the computing device to display information about resources comprises to obtain information about the first resource from the first remote server and obtain information about the second resource from the second remote server.

* * * * *